March 6, 1962   B. H. PINCKAERS   3,024,390
CONDITION SENSING APPARATUS
Filed Dec. 3, 1958   2 Sheets-Sheet 1

INVENTOR.
BALTHASAR H. PINCKAERS
BY
ATTORNEY

Fig.3

3,024,390
CONDITION SENSING APPARATUS
Balthasar H. Pinckaers, Hopkins, Minn., assignor to Minneapolis-Honeywell Regulator Company, Minneapolis, Minn., a corporation of Delaware
Filed Dec. 3, 1958, Ser. No. 778,016
21 Claims. (Cl. 317—148.5)

The present invention is concerned with an improved condition sensing apparatus and more particularly with an improved condition sensing apparatus providing transistor control network means having novel features of construction facilitating the use of conventional detecting elements, such as photoemissive cells or flame rods.

As is well-known, transistor devices are controllable current conducting devices which are responsive to electrical control or signal currents. The preferred embodiments of the present invention utilize a condition sensing means in the form of a photoemissive cell which is responsive to light, for example, the flame at a fuel burner unit, and in response thereto this cell passes a small magnitude electrical current, in the range of micro-amps. This small signal current is stored in a capacitor and after a given charge has been accumulated thereon, this capacitor is discharged by means of a relaxation oscillator type circuit to control a transistor type monostable network. This monostable network is triggered from a stable to an unstable condition and is maintained in this unstable condition for a relatively long time period, with respect to the discharging time of the above-mentioned capacitor, thereby performing a pulse stretching function.

Specifically, the present invention provides an improved pulse stretching arrangement. This pulse stretching arrangement functions on the principle that the state of charge of a pulse stretching capacitor is changed over the above-mentioned relatively long time period and while this state of charge is changing, the monostable network is maintained in its unstable condition for the relatively long time period to perform the pulse stretching function.

A teaching of the present invention provides means to immediately restore this pulse stretching capacitor to its initial state of change at the end of the relatively long time period. In this manner, the network is immediately conditioned to again receive a pulse of electrical current from the relaxation oscillator network and again provide the pulse stretching function.

As mentioned, the small signal current derived from the condition sensing means is the electrical energy which charges the first mentioned capacitor. Another feature of the present invention provides means whereby in an initial condition, a static voltage is provided which aids in the charging of the first mentioned capacitor. With such a construction, the monostable network is first pulsed as a result of a given minimum signal current, also called flame current, which establishes a given voltage upon the first mentioned capacitor.

Once the monostable network is initially pulsed, means are provided whereby the recharging of the first mentioned capacitor is aided by a relatively high transient voltage effect. With such a construction, the above-mentioned minimum signal current is necessary to initially pulse the monostable network, however, once pulsed, the relatively high transient voltage aids in the recharging of the first mentioned capacitor and thereafter the monostable continues to sense the presence of the condition even though the intensity of the condition, for example flame, may decrease somewhat.

In accordance with a teaching of the present invention, this transient voltage effect may be derived from the pulse stretching capacitor which acts as a voltage source as its initial state of charge is being restored, as described above. Since this transient voltage aids the signal current in recharging of the first mentioned capacitor, the larger the signal current, the quicker the first mentioned capacitor is charged to that given charge which causes the first mentioned capacitor to again discharge to control the monostable network. However, regardless of the actual magnitude of the signal current, so long as it is above a given minimum value, the monostable network very quickly returns to its unstable state each time that it reverts to its stable state.

Referring now to the drawings.

FIGURE 1

Figure 1:
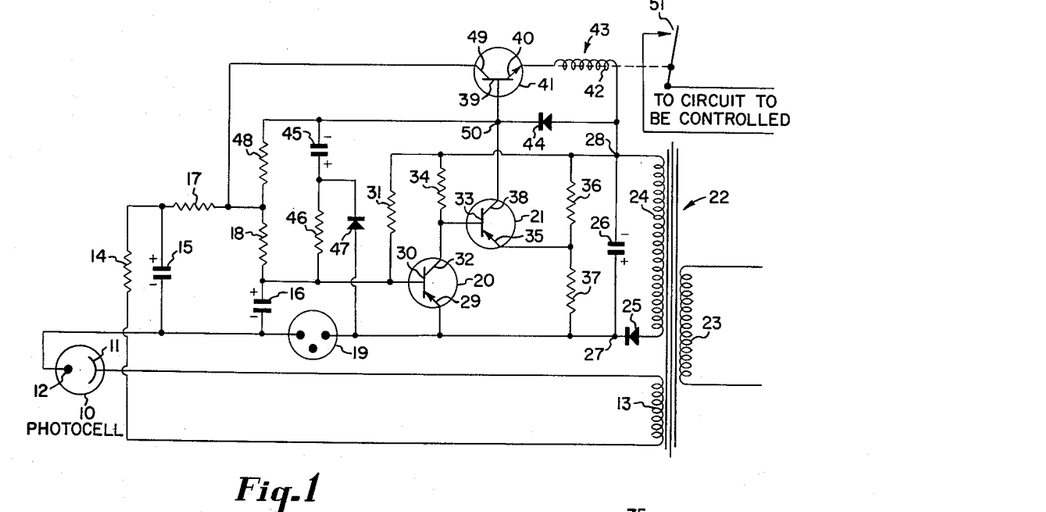
FIGURE 1 is a showing of a first embodiment of the present invention.

Referring specifically to FIGURE 1, the reference numeral 10 designates a condition sensing means in the form of a photoemissive cell having a cathode 11 and an anode 12. The cathode 11 is connected to the upper terminal of a transformer secondary winding 13. The lower terminal of this secondary winding is connected through a resistor 14 and a capacitor 15 to the anode of the photo cell. Photo cell 10 acts as a rectifying impedance in the presence of light and in this manner capacitor 15 is charged as shown upon photo cell 10 being subjected to light.

More specifically, photocell 10 may be the sensing element of an electronic flame detector associated with a fuel burner unit wherein the output of the apparatus of FIGURE 1 is connected to control associated units of a combustion safeguard apparatus to insure safe operation of the fuel burner unit. For purposes of simplicity, the embodiments of the present invention are shown in their simplest form and no definite control function is disclosed since any of a variety of control functions may be performed with such an apparatus.

The voltage on capacitor 15 is distributed to a further capacitor 16, through a series circuit including a resistor 17 and a resistor 18. In this manner, capacitor 16 is charged as indicated.

Capacitor 16 forms a portion of a relaxation oscillator type network including a gas discharge device 19. This relaxation oscillator circuit, including capacitor 16 and gas discharge device 19, is effective upon a given charge being accumulated on capacitor 16 to cause this capacitor to discharge through gas tube 19 and through the input circuit of a monostable electronic network including transistors 20 and 21.

This monostable electronic network has a stable condition wherein transistor 20 is conducting and transistor 21 is nonconducting. Considering this network in greater detail, a transformer 22 is provided having a primary winding 23 adapted to be connected to a source of alternating voltage, not shown. Transformer 22 includes the above-mentioned secondary winding 13 as well as a further secondary winding 24. Secondary winding 24 is connected to a rectifier 25 and a capacitor 26 to form a source of D.C. voltage having a positive terminal 27 and a negative terminal 28. The emitter electrode 29 of transistor 20 is directly connected to the positive terminal 27 and the base electrode 30 is connected through an impedance element in the form of a resistor 31 to the negative terminal 28. In this manner, a biasing current is supplied for transistor 20 which normally maintains this transistor in its stable conducting state. The collector electrode 32 of transistor 20 is connected to the base electrode 33 of transistor 21 and through an impedance in the form of resistor 34 to the negative terminal 28. Emitter electrode 35 of transistor 21 is connected to the midpoint of a voltage dividing means made up of resistors 36 and 37. The polarity of the voltage developed across resistor 37 is such as to bias transistor 21 to be non-conductive since with transistor 20 in a conducting state the base electrode 33 is for all practical purposes connected directly to the positive terminal 27 whereas the emitter 35 is connected to a more negative voltage existing at the junction of resistors 36 and 37. The collector electrode 38 of transistor 21 is connected through the input circuit of a further transistor 41 and through the winding 42 of an output relay 43 to the negative terminal 28.

It will be noted that transistor 41 is an n-p-n type transistor whereas transistors 20 and 21 are p-n-p type transistors.

A diode rectifier 44 is connected from negative terminal 28 to the base electrode 39 of transistor 41. As will be described more completely, the circuit including diode 44 functions upon de-energization of relay winding 42 such that the collapsing magnetic flux of this winding causes an input current to flow from the base electrode 39 to the emitter electrode 40 and to thereby partially or completely short-circuit resistor 48 which then causes a substantially larger voltage to appear across resistor 18 for a short time interval.

As mentioned, transistors 20 and 21 form a monostable network having a stable condition wherein transistor 20 is conductive and transistor 21 is nonconductive. Upon capacitor 16 receiving a given charge, this capacitor discharges through the relaxation oscillator circuit including gas tube 19 and this monostable network is pulsed or triggered to its unstable condition. Means are provided such that this monostable network is maintained in the unstable condition for a relatively long time period to thereby function as a pulse stretcher, stretching the discharge current pulse of capacitor 16.

This pulse stretching function is accomplished by means including a pulse stretching capacitor 45. Considering the stable condition of the monostable network, transistor 20 is conductive and therefore its base electrode 30 is substantially at the same potential level as positive terminal 27. Therefore, capacitor 45 is charged to substantially the full voltage existing between terminals 27 and 28, the polarity of this charge being indicated in the drawing.

Consider now the instant that the monostable network is first triggered to its unstable condition. Transistor 20 is then nonconductive, which renders transistor 21 conductive. As a result, a voltage suddenly appears across winding 42 of relay 43 which is nearly equal to the D.C. supply voltage existing across capacitor 26. Therefore the voltage from terminal 27 to terminal 50 suddenly becomes much less than the voltage across capacitor 45, so that capacitor 45 immediately starts to discharge. Capacitor 45 discharges through 2 paths. One path is from positive terminal of capacitor 45 through resistors 46, 18 and 48 to negative terminal of capacitor 45. The other path is through resistor 46 and into the base of transistor 29. Clearly then base 30 of transistor 20 becomes positive with respect to emitter 29. This voltage is equal to the voltage of capacitor 45, which is exponentially decreasing, minus the voltage drop in resistor 46 caused by the discharge current of the path through resistors 18 and 48. Therefore, capacitor 45 discharges and while so discharging the base electrode 30 of transistor 20 is maintained positive with respect to the emitter electrode 29, thereby maintaining the monostable network in its unstable condition. When capacitor 45 has substantially completely discharged, the normal biasing circuits for transistor 20 are effective to return the transistors to their stable condition.

As one of its features, the present invention provides a means which substantially immediately restores the condition of charge of capacitor 45 upon the monostable network returning to its stable condition. In the embodiment of FIGURE 1, this is accomplished by means of a diode rectifier 47. This rectifier is connected such that upon transistor 20 again being rendered conductive, substantially the full voltage between terminals 27 and 28 is applied to capacitor 45 through diode 47 and the capacitor thereby substantially immediately recharges. In this manner, the pulse stretching network is immediately conditioned to perform a further pulse stretching function upon the immediate re-occurring discharge of capacitor 16 through the relaxation oscillator circuit. It is precisely one of the features of this invention to cause a nearly immediate re-occurring discharge of capacitor 16 when the monostable circuit reverts to stable state, so that as long as a certain minimum flame current exists the monostable circuit will reside predominantly in the unstable state and only periodically for a very short interval in the stable state.

Not only does capacitor 45 function in its pulse stretching capacity, but also, the voltage on this capacitor can be considered to be a source of voltage which is connected to voltage dividing means in the form of resistor 18 and a further resistor 48. In this manner, a portion of the voltage present at any time on capacitor 45 is developed across resistor 18 and the polarity of this voltage is such that the lower terminal is positive with respect to the upper terminal. By tracing the charging circuit for capacitor 16 it will be noted that this voltage across resistor 18 is in an aiding relationship to the voltage on capacitor 15 and therefore the magnitude of voltage across resistor 18 determines the amount of charge necessary on capacitor 15 to cause the relaxation oscillator circuit to function. The magnitude of the charge on capacitor 15 is in turn indicative of the light conditions which are being viewed by photo cell 10.

However, consider now the instant when the monostable network including transistors 20 and 21 initially reverts from its unstable to its stable condition. In its unstable condition, relay winding 42 was energized due to conduction of transistor 21. Upon the network reverting to its stable condition, transistor 21 becomes nonconductive and the tendency is for current to no longer flow through winding 42 of relay 43. Therefore, the magnetic flux of winding 42 tends to collapse and in so collapsing a voltage is generated which tends to maintain the current flowing in this winding. The direction of this current flow is in the forward direction of diode 44 and this current flow functions as an input current to transistor 41, maintaining this transistor conductive. Therefore, also current flows from collector electrode 49 to base electrode 39 of transistor 41, which then acts the same as a low impedance. This low impedance is connected in parallel with resistor 48 and in effect substantially short circuits this resistor. As a result, the full voltage on capacitor 45, which is restored by diode 47 as above described, is briefly developed across resistor 18.

As was mentioned, this voltage across resistor 18 aids the voltage on capacitor 15 in recharging capacitor 16 and since the voltage across resistor 18 is the full voltage of capacitor 45, the voltage on capacitor 15 need not be as high as was originally necessary to charge capacitor 16 to the point where the relaxation oscillator circuit operated. From this, it can be readily appreciated that a certain maximum light condition is necessary in order for relay 42 to be energized. However, once this maximum light condition has been achieved, and the monostable network has completed one cycle from its stable to its unstable and back to its stable condition, a somewhat lower magnitude of light causes the monostable network to continuously cycle between its two states. As a result, relay 42 is maintained energized by a somewhat weaker light condition than was necessary to cause it to initially pull in. It is of course recognized that if the light value decreases to a certain minimum value, relay 42 is de-energized. Furthermore, monostable network continues to cycle, under the presence of light at photo cell 10, at a sufficiently high rate to maintain relay 43 continuously energized so long as the photocell is subjected to this light.

Operation of FIGURE 1

Considering the apparatus of FIGURE 1 in greater detail, it will first be assumed that the apparatus of FIGURE 1 is utilized as a flame detector portion of a combustion safeguard apparatus. The function of apparatus of FIGURE 1 is therefore to sense the presence of flame at the fuel burner unit and to perform a control function by means of energization of relay 43. As an example, energization of relay 43 may deenergize a safety switch, thereby indicating that flame has properly been established at the fuel burner unit.

With the apparatus in its standby condition, that is, with no flame present at the fuel burner unit, the capacitors 15 and 16 are in a discharged condition. Capacitor 45 is charged, as shown. The monostable network is in its stable condition wherein transistor 20 is conductive and transistor 21 is nonconductive. Furthermore, transistor 41 is nonconductive and relay 43 is de-energized.

Assume now that photo cell 10 senses the presence of flame. A charging circuit can be traced for capacitor 15 from the lower terminal of secondary winding 13 through resistor 14, capacitor 15, and photo cell 10 to the upper terminal of winding 13. This circuit functions effectively as a half wave rectifier and electrical charge is accumulated on capacitor 15. The resulting voltage on capacitor 15 is distributed to capacitor 16 through a circuit including resistors 17 and 18. With transistor 20 in its stable conducting state, its base electrode 30 is at approximately the potential of terminal 27. A circuit can be traced from terminal 27 through the emitter to base circuit of transistor 20, resistor 18, resistor 48, base to emitter circuit of transistor 41, and winding 42 to terminal 28. From this circuit it can be seen that a portion of the source 27—28 is developed across resistor 18. This voltage existing across resistor 18, which is effectively in series with that on capacitor 15, is of a polarity to aid in the charging of capacitor 16.

When a sufficient charge has been accumulated on capacitor 16, the voltage developed across the electrodes of gas tube 19 is sufficiently high to cause the gas tube to break down. Capacitor 16 then tends to discharge through a circuit which can be traced from the upper plate of this capacitor through the base to emitter electrodes of transistor 20 and through gas tube 19 to the lower plate of capacitor 16. As a practical matter, the effect of the above traced circuit is to reduce the emitter to base biasing current of transistor 20 and once this current has been substantially reduced, transistor 20 switches to a nonconducting condition.

With transistor 20 in a nonconducting condition, the collector current of this transistor becomes very low and thereby a substantial negative voltage is placed on the base electrode 33 of transistor 21. Transistor 21 is then triggered to a conducting condition. This is the unstable condition of the monostable network wherein transistor 20 is nonconducting and transistor 21 is conducting.

Capacitor 45, and particularly the charge thereon, is now effective to perform a pulse stretching function to maintain the monostable network in this unstable condition for a relatively long time period in relation to the time required to discharge capacitor 16. In other words, a short time duration pulse of electrical current from capacitor 16 is effective to place the monostable network in its unstable condition in which it is maintained for a relatively long time period to thereby effectively stretch this short pulse of current received from capacitor 16.

Considering this pulse stretching feature in detail, it will be remembered that capacitor 45 is charged to substantially the full voltage of source 27—28. With transistor 21 conductive, the total voltage existing between terminals 27 and 28 is dropped across a series circuit including resistor 37, transistor 21, transistor 41 and relay 43. Since relay 43 is the major impedance in this circuit, substantially all of this voltage appears across the relay. For this reason, the junction of collector 38 and base 39, that is junction 50, is at a slightly lower potential than terminal 27. Therefore, the negative voltage of the upper plate of capacitor 45 is connected through transistor 21 and resistor 37 to the emitter 29 of transistor 20, and the positive voltage on the lower plate of capacitor 45 is connected through resistor 46 to base 30, thereby maintaining transistor 20 in its unstable nonconductive state. The charge on capacitor 45 is gradually dissipated through a series circuit including resistors 46, 18, and 48. This reduction of charge on capacitor 45 requires a certain time period and it is during this time period that the pulse is stretched, in other words the monostable network is maintained in its unstable condition during this time period.

Once capacitor 45 has discharged sufficiently, the normal biasing current for transistor 20 is effective to trigger the monostable network to its stable condition wherein transistor 20 is conductive and transistor 21 is nonconductive.

Considering for a moment the detailed operation of transistor 21, when this transistor is conductive, a current flow circuit can be traced from terminal 27 through resistor 37, emitter 35 and collector 38, terminal 50, base 39 and emitter 40, and relay winding 42 to terminal 28. Due to this circuit, relay 43 is operatively energized and its switch 51 is closed to perform a control function, not shown.

Consider now the instant wherein transistor 21 is again rendered nonconductive. The above traced current flow circuit is therefore broken and the magnetic flux generated by winding 42 begins to collapse. In so collapsing, this magnetic flux induces a voltage in winding 42 which tends to maintain the current flowing. As a result, a current flows from the right hand terminal of winding 42 through rectifier 44, terminal 50, base 39, and emitter 40 to the other side of winding 42. In this manner, de-energization of relay 43 is delayed. A second current flow circuit can also be traced through relay 43. This circuit flow is due to diode 47 recharging capacitor 45 and can be traced from terminal 27 through diode 47, capacitor 45, terminal 50, base 39 and emitter 40, and winding 42 to terminal 28. This current not only rapidly recharges capacitor 45 but also tends to bias transistor 41 conductive and to maintain relay 43 energized.

As mentioned above, an input current flows to transistor 41 due to both the collapsing magnetic flux of winding 42 and the recharging current of capacitor 45. This input current to transistor 41 causes the collector to base impedance to be very low. This collector to base impedance is in parallel with resistor 48 and therefore tends to short this resistor. Therefore, the voltage which is rapidly built up across capacitor 45, and which is approximately equal to that existing between terminals 27 and 28, is now developed across resistor 18. In this manner, the voltage present across resistor 18 is higher than that which existed in the standby condition wherein resistor 48 was also effectively in series with resistor 18. Therefore, a high transient voltage effect appears across resistor 18 which aids the voltage on capacitor 15 in recharging capacitor 16 to a value which again within a short time interval causes the relaxation oscillator to function and the monostable network to be pulsed or triggered to its unstable condition.

A complete cycle of operation of FIGURE 1 has now been traced to such cycles re-occur so long as photo cell 10 continues to sense the presence of flame. Each cycle consists of a relatively long time period during which transistor 21 is conductive and a time interval which is very short during which transistor 21 is nonconductive. Because of this and the action of diode 44, relay 42 is effectively continuously energized to maintain switch 51 closed.

From the above description it can be seen that an improved condition sensing apparatus has been provided wherein flame sensing means in the form of a photo cell 10 is effective to charge capacitor 16 in a relaxation oscillator circuit. This relaxation oscillator circuit is connected in controlling relation to a monostable network and is effective to trip or pulse this network to its unstable condition. A pulse stretching feature is provided to maintain this monostable network in its unstable condition for a relatively long time period. Furthermore, means are provided in the form of diode 47 to substantially immediately restore the condition of charge of the pulse stretching capacitor 45 to thereby insure pulse stretching during the time that the monostable network is in the unstable state. Means are provided in the form of transistor 41 to short resistor 48 and produce a transient voltage effect across resistor 18 which aids photo cell 10 in recharging the relaxation oscillator capacitor 16, thereby insuring that while a maximum flame is necessary to initially cause relay 43 to pull in, this relay is maintained energized from a somewhat lower magnitude flame current, and also insuring that, so long as this lower magnitude flame current exists a relaxation oscillator pulse will occur very shortly after each time that the monostable network reverts to its stable state. It is of course recognized that the voltage across resistor 18 is at no time sufficient in and of itself to charge capacitor 16 to cause the relaxation oscillator circuit to function.

FIGURE 2

Figure 2:
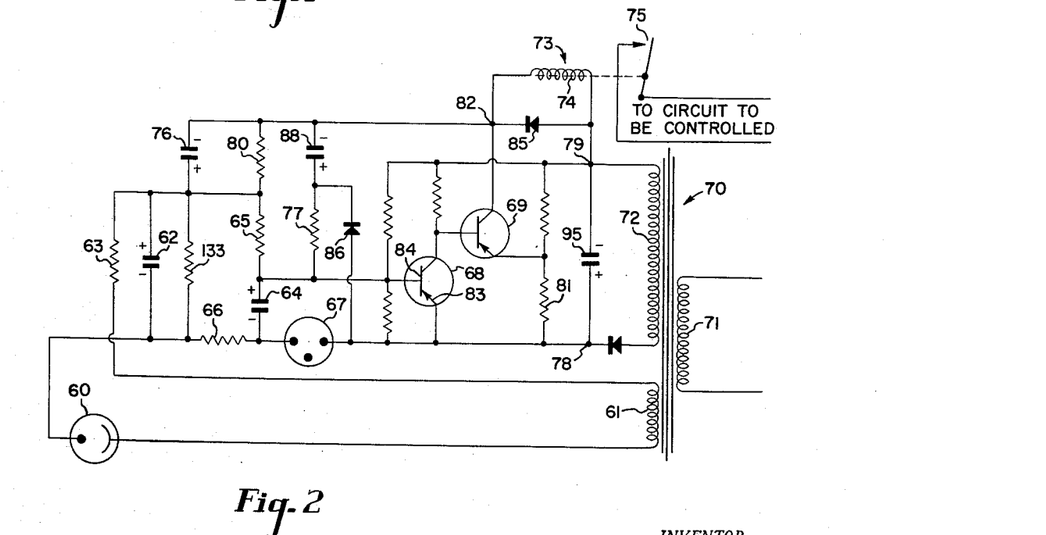
FIGURE 2 is a showing of a second embodiment of the present invention.

Referring now to FIGURE 2. The apparatus of this figure uses a similar photoemissive cell 60 which receives its operating voltage from a transformer secondary winding 61 and charges a capacitor 62 through a resistor 63, much in the manner described in connection with FIGURE 1.

The voltage developed across capacitor 62 is effective to charge a further capacitor 64 through resistors 65 and 66. In the modification of FIGURE 2, capacitor 64 performs the same function as capacitor 16 of FIGURE 1. In other words, this capacitor is a portion of a relaxation oscillator circuit including a gas tube 67.

Resistor 66 is selected having two considerations in mind. First, this resistor must be of a high enough magnitude to allow tube 67 to extinguish once it is fired and thereby isolate the tube 67 from capacitor 62. Secondly, this resistor must be of a low enough magnitude to allow capacitor 64 to recharge from capacitor 62 in a relatively short time interval. Resistor 66 is selected to perform both functions satisfactorily.

The output of the relaxation oscillator controls the input of a monostable network including transistors 68 and 69. Transistors 68 and 69 correspond to transistors 20 and 21 of FIGURE 1 and the network including these transistors is a monostable network having a stable condition wherein transistor 68 is conductive and transistor 69 is nonconductive. A comparison of the circuits of FIGURES 1 and 2 shows that they are substantially identical and in fact they do operate in a similar manner.

Operating voltage for the apparatus in FIGURE 2 is derived from a transformer 70 having a primary winding 71 connected to a source of alternating voltage, not shown, and having secondary windings 72 and 61.

In the case of FIGURE 2, the output circuit of transistor 69 does not include a further transistor, such as transistor 41 in FIGURE 1, but rather includes an output relay 73 having a winding 74 and switch means 75. As can be seen, winding 74 of the relay is energized when transistor 69 is in its unstable or conducting state.

The monostable network of FIGURE 2 is maintained in its unstable condition for a relatively long period of time, such that the network performs a pulse stretching function, by means of a pulse stretching capacitor 88 which corresponds to capacitor 45 of FIGURE 1. The primary difference between FIGURES 1 and 2 is the manner in which the transient voltage, which aids the flame current in recharging the relaxation oscillator capacitor 64, is derived. In the modification of FIGURE 2, a further capacitor 76 is provided and this capacitor is connected across resistor 80, this resistor corresponding to resistor 48 of FIGURE 1.

Operation of Figure 2

Consider now the standby condition of the apparatus of FIGURE 2. In this condition a flame is not sensed by photo cell 60 and capacitors 62 and 64 are discharged. The monostable network including transistors 68 and 69 is in its stable condition wherein transistor 68 is conductive and transistor 69 is nonconductive. Relay 73 is therefore de-energized. Capacitor 88 is charged to substantially the complete voltage of the source existing between positive terminal 78 and negative terminal 79. Furthermore, this voltage is distributed across resistors 65 and 80 and in this manner, capacitor 76 is charged, as indicated.

Assume now that photo cell 60 senses the presence of flame at a fuel burner unit. A circuit can now be traced from the upper terminal of transformer secondary winding 61 through resistor 63, capacitor 62, and photo cell 60 to the lower terminal of this secondary winding. This current flow circuit is effective to charge capacitor 62 to the voltage shown and this voltage is then distributed through resistors 65 and 66 to charge capacitor 64 of the relaxation oscillator network. Upon capacitor 64 being charged to a sufficiently high voltage, gas tube 67 breaks down and a short time duration pulse of current flows to trigger transistor 68 to its unstable condition and to thereby trigger transistor 69 to its unstable condition. That is, transistor 68 becomes nonconductive and transistor 69 becomes conductive.

Upon transistor 69 becoming conductive, a current flow circuit can be traced from terminal 78 through resistor 81, the emitter to collector circuit of transistor 69, and relay winding 74 to terminal 79. Relay winding 74 is thereby energized to close switch 75 and perform a control function, not shown.

As was described in connection with FIGURE 1, upon transistor 69 becoming conductive, the potential of collector electrode, that is terminal 82, is raised to substantially the potential level of terminal 78. The voltage on capacitor 88 is then effective to place a negative voltage on emitter 83 and a positive voltage on base 84. This effectively biases transistor 68 to its unstable condition so long as capacitor 88 remains charged above a predetermined value. The charge on capacitor 88, however, gradually leaks off or is dissipated through a circuit which can be traced through resistor 77, resistor 65, and resistor 80. Furthermore, during this time capacitor 76 discharges through resistor 80.

The time period during which capacitor 88 is discharging to this predetermined value is the time during which the pulse stretching action takes place since the short time duration current received from capacitor 64 has the effect of maintaining the monostable network in its unstable condition for a relatively long time period. After this relatively long time period, the normal biasing currents of transistor 68 are effective to return the monostable network to its stable condition. When this occurs, the above traced circuit which energizes winding 74 of relay 73 is effectively opened at transistor 69. A diode 85 is provided which shunts the winding 74 of relay 73 and prevents a high inductive voltage being developed across the electrodes of transistor 69 which might possibly damage this transistor.

The instant that the monostable network returns to its stable condition, rectifier 86 is effective to substantially immediately restore capacitor 88 to its initial state of charge. This recharging circuit can be traced from terminal 78 through diode 86, capacitor 88, and winding 74 of relay 73 to terminal 79. From this circuit it can be seen that the recharging current for capacitor 88 aids in maintaining energized relay 73. In fact, this relay is maintained continuously energized so long as flame is sensed by photo cell 60 since the monostable network resides predominantly in its unstable state. Only at certain intervals does the monostable network return to its stable state but stays in that state only long enough to partially or completely recharge capacitor 88. How much this capacitor recharges depends on the specific voltage across capacitor 62, hence on the photo cell or flame current. However the important thing is that the network is so designed that even if capacitor 88 must nearly charge up to the D.C. supply voltage, the time necessary to do this is much shorter than the drop-out time of the relay. It can be seen now that upon return of the monostable circuit to its stable state, when viewing flame, a certain maximum transient voltage is available across resistor 65 to aid in very rapidly bringing the voltage across capacitor 64 back up to the firing voltage of tube 67. How much actual voltage across resistor 65 is needed to produce another pulse through tube 67 depends of course on the actual voltage present across capacitor 62. The circuitry is so designed that at no value of flame current, or voltage across capacitor 62, does the relay cycle on and off. At a certain value of flame current the relay will pull in and stay in until the flame current is lowered a certain amount. The drop-out will occur when the maximum transient voltage available across resistor 65, when monostable circuit returns to its stable state, combined with the voltage existing across capacitor 62 is too low to produce another discharge through the tube 67.

As mentioned previously, diode 86 functions as a means to substantially immediately replace or restore the initial state of charge of capacitor 88 so that the monostable network is in a condition to once again immediately perform a pulse stretching function when capacitor 64 is charged to a voltage causing the relaxation oscillator to function. Also, as explained in connection with FIGURE 1, capacitor 88 performs the additional function of providing a voltage source across resistors 65 and 80. It will be remembered that capacitor 76 discharged through resistor 80 during the pulse stretching portion of the cycle and therefore resistor 80 is substantially short-circuited by the now discharged capacitor 76. The voltage existing across capacitor 88 therefore initially appears only across resistor 65 and in this manner a high voltage is provided across resistor 65 to aid capacitor 62 in recharging capacitor 64. This voltage is higher than that initially present across resistor 65. In this manner, means are provided which is effective upon the monostable network returning to its stable condition to provide a high transient voltage effect across resistor 65 to aid the recharging of capacitor 64. This high transient voltage across resistor 65 is by itself insufficient to recharge capacitor 64 so that another oscillator pulse occurs. However, if the then existing voltage across capacitor 62 which is a function of the flame current has a certain minimum value another oscillator pulse will occur during the time this transient voltage is present across resistor 65. With such a construction, a given maximum magnitude flame current must be received from photo cell 60 in order to initially trigger or pulse the monostable network. However, once triggered, a lesser value flame current from photo cell 60 maintains the monostable network cycling between its stable and unstable conditions to maintain relay 73 continuously energized since this high transient voltage effect provides a greater aiding voltage across resistor 65 than initially present. FIGURE 2 differs from FIGURE 1 in the manner in which this transient voltage is produced. The end result is, however, the same.

FIGURE 3

Figure 3:
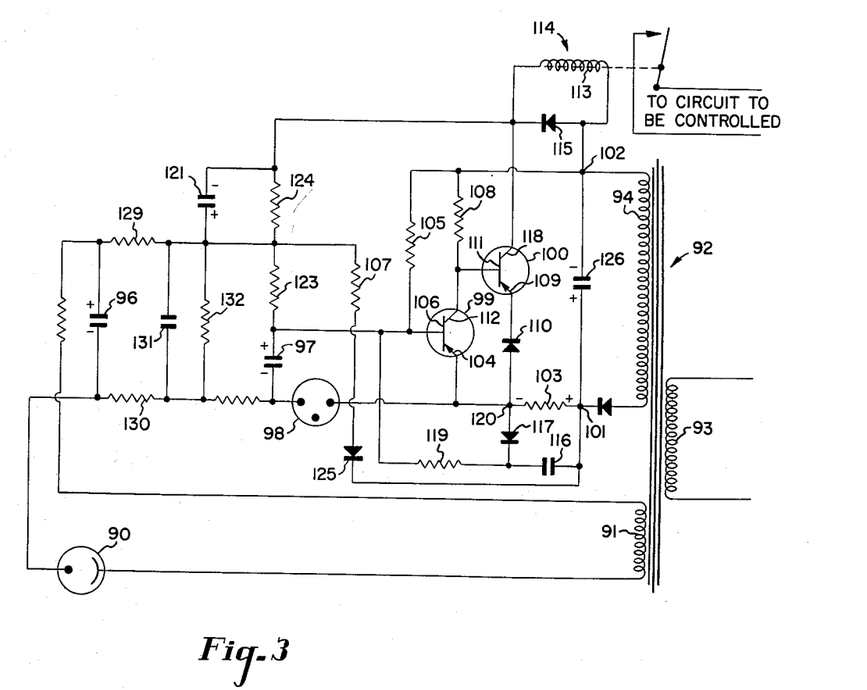
FIGURE 3 is a showing of a third embodiment of the present invention.

Referring now to FIGURE 3, this embodiment of the present invention provides a somewhat different manner of providing the above described pulse stretching feature, and furthermore, provides a safety feature which insures that the output relay will not be energized in the event that the capacitance value of the electrolytic capacitor in the D.C. voltage source reduces to a very low value.

Resistor 133, which shunts capacitor 62, is provided to control the drop-out timing of relay 73 since this resistor loads capacitor 62 and when flame fails so that electrical current no longer is supplied to capacitor 62, capacitor 62 is discharged at a rate dependent primarily upon the magnitude of resistor 133. As soon as capacitor 62 is discharged to a certain level, the monostable network remains in its stable condition and relay 73 is de-energized.

Referring to FIGURE 2 for a moment, it can be seen that the D.C. voltage source 78—79 is produced across a capacitor 95 which is adapted to be charged through secondary winding 72. This capacitor 95 is an electrolytic capacitor having a relatively high capacitance. However, it is possible under unusual circumstances for the capacitance value of this capacitor to reduce to a very low value. When this occurs, the voltage present between the two terminals 78 and 79 is a D.C. voltage having a relatively low average value and a large ripple. This D.C. voltage may, however, be of a sufficient magnitude to energize relay 73 if transistor 69 is rendered conductive. Furthermore, the ripple present on this voltage between terminals 78 and 79 is effective to quickly charge the pulse stretching capacitor 88 through diode 86 on the peak portions of this ripple voltage.

By way of example, if the monostable network is initially placed in its unstable condition due to the presence of flame, this large ripple voltage between terminals 78 and 79 may be effective to re-charge capacitor 88 on the peak portions of the ripple, and during the low value portions of this ripple voltage, this capacitor slowly discharges to maintain the monostable network in its unstable condition. If this should occur, photocell 16 loses control and relay 73 will remain energized independent of the actual presence of flame.

While this is an highly unusual condition, the modification of FIGURE 3 provides a structure whereby this condition is avoided.

Referring specifically to FIGURE 3, a condition sensing means 90 in the form of a photocell is again provided and receives its operating voltage from secondary winding 91 of a transformer 92 having a primary winding 93 and a further secondary winding 94. In the manner above described, photo cell 90 is effected to place a charge on capacitor 96 upon being subjected to a flame and this charge is distributed through an R.C. network 129—132 to charge capacitor 97, which in conjunction with gas tube 98 forms a relaxation oscillator circuit controlling the input of a monostable network including transistor 99 and transistor 100. Transistors 99 and 100 form a monostable network wherein transistor 99 is normally conductive and transistor 100 is normally nonconductive. This transistor network functions in a similar manner to that of the above described FIGURES 1 and 2. The direct current operating voltage for the monostable network is provided across terminals 101 and 102. The positive terminal 101 is connected through a resistor 103 to the emitter electrode 104 of transistor 99. The negative terminal 102 is connected through a resistor 105 to the base electrode 106 of transistor 99. By means of these circuits, transistor 99 is provided with a biasing current which establishes the stable conducting state for this transistor. A further resistor 108 connects the collector electrode to the negative terminal 102.

Transistor 100 has its emitter electrode 109 connected through a diode 110 and through resistor 103 to the positive terminal 101. The base electrode 111 is connected directly to the collector electrode 112 of transistor 99. By means of such circuit connections, the forward voltage necessary to render diode 110 conductive is effective to maintain transistor 100 cutoff, this being its stable condition. The collector electrode 118 of this transistor is connected through the winding 113 of a relay 114 to the negative terminal 102. A diode 115 is provided which shunts the winding 113 and prevents a high inductive voltage for being applied to the electrodes of transistor 100 upon this relay winding being deenergized.

In the modification of FIGURE 3, the pulse stretching capacitor is capacitor 116 and the means to substantially immediately restore the initial condition of charge to this capacitor is diode 117.

In order to describe the operation of the pulse stretching feature, first consider the operation in the monostable nework in its stable condition. In this condition, transistor 99 is conductive and a current flow circuit can be traced from positive terminal 101 through resistor 103, emitter 104 and collector 112 of transistor 99, and resistor 108 to the negative terminal 102. The magnitude of this current is relatively low due to the high impedance of resistor 108, and therefore a relatively low magnitude voltage is developed across resistor 103 such that its right hand terminal is positive of respective left hand terminal, as indicated. The potential level of base 106 is near that of terminal 101. Consider now the unstable condition of operation of the monostable network. In this condition, transistor 99 is non-conductive and transistor 100 is conductive. A current flow circuit can now be traced from a positive terminal 101 through resistor 103, diode 110, emitter 109 and collector 118 of transistor 100, and relay winding 113 to the negative terminal 102.

The overall impedance of this last traced circuit is relatively low compared to that above described for the condition wherein transistor 99 is conductive. This then causes a relatively high voltage to be developed across resistor 103, the polarity of this voltage being such that the right hand terminal is positive. Capacitor 116 now charges through a circuit which can be traced from terminal 101 through capacitor 116, resistor 119, base 106, to terminal 120. So long as capacitor 116 continues to charge, base 106 is biased to cutoff and transistor 99 is maintained in its unstable or non-conducting state.

Capacitor 116 is charged through a resistive network and a certain time period is necessary for this capacitor to assume a charge determined by the voltage developed across resistor 103. It is during this time that the monostable network is maintained in its unstable condition and in which the pulse stretching occurs.

However, once capacitor 116 is charged, the cut-off biasing of transistor 99 is removed and the monostable network returns to its stable condition wherein transistor 99 is conductive. Since the current flow from emitter to collector of this transistor is relatively low, the voltage developed across resistor 103 is reduced and at this time, diode 117 is effective to substantially immediately restore the condition of charge of capacitor 116. The discharge circuit for capacitor 116 can be traced from the right hand plate of this capacitor to terminal 101, resistor 103, terminal 120 and diode 117 to the left hand plate of this capacitor. In this manner, capacitor 116 is substantially immediately discharged and is restored to its initial condition such that the monostable network is again in a condition to stretch a further input signal pulse.

The apparatus of FIGURE 3 provides a further function wherein capacitor 121 discharges through a circuit including resistor 107 and diode 125 to aid in the pulsing or triggering of the monostable network to its unstable condition. As above described, it is the slow charging of capacitor 116 due to a relatively high voltage developed across resistor 103 which holds the monostable network in its unstable condition. However, consider now the instant in which transistor 99 first becomes non-conductive. Transistor 100 now becomes conductive and a current flow circuit can be traced from positive terminal 101 through resistor 103, diode 110, emitter 109 and collector 118, and relay winding 113 to the negative terminal 102. Initially, the magnitude of this current is relatively small due to the inductive effect of coil 113. This in turn means that the voltage developed across resistor 103 does not immediately increase to a high value, but rather this voltage increases exponentially. In order to insure that the monostable network immediately following the initial oscillator pulse remains in its unstable condition, for a relatively long time period, the circuit, above mentioned, including resistor 107 and diode 125 is provided. This circuit establishes a discharge path for capacitor 121 which can be traced from the lower plate thereof through resistor 107, diode 125, terminal 101, resistor 103, diode 110, and emitter 109 and collector 118 of transistor 100 to the upper plate of capacitor 121. This current flow causes an additional voltage to be developed across resistor 103 and as a result, the total voltage initially present across resistor 103 is of sufficient magnitude to cause capacitor 116 to charge at a rate which is high enough to maintain the monostable network in its unstable condition.

The apparatus of FIGURE 3 also includes a structure which provides the transient voltage effect above described in connection with FIGURES 1 and 2. In the modification in FIGURE 3, capacitor 121 functions in much the same manner as capacitor 76 of FIGURE 2. Again considering the monostable network in its stable condition, a current flow circuit can be traced from terminal 101 through resistor 103, emitter 104 and base 106 of transistor 99, resistor 123, resistor 124 and winding 113 to negative terminal 102. From this above traced circuit it can be seen that a voltage is developed across resistor 123 which is of such a polarity as to aid capacitor 96 in charging capacitor 97. In other words, the voltage developed by this above traced circuit aids the flame current in charging the relaxation oscillator capacitor, which capacitor subsequently discharges to trigger the monostable network from its stable to its unstable condition.

During the time that the monostable network is in its unstable condition, capacitor 121 discharges through the above traced circuit including resistor 107 and diode 125, as well as through a further circuit including resistor 124. When the monostable network returns to its stable condition, capacitor 121, now in its discharged state, forms a short circuit around resistor 124, and a much higher voltage is developed across resistor 123. This is a transient type voltage since it decreases in magnitude as capacitor 121 becomes charged, and, as above described, this voltage insures that the monostable network continues to cycle between its stable and unstable conditions even though the magnitude of flame current is decreased somewhat by causing another oscillator pulse to occur very shortly after the monostable network returns to its stable state.

The apparatus of FIGURE 3 also includes an improved input circuit, when compared to the input structure of FIGURES 1 and 2. This improved structure resides in the use of the R-C network 129—132 which functions to provide safe operation in the event that photo cell 90 becomes shorted. Also, such construction allows photo cell 90 to be placed a relatively long distance from the remaining portion of the apparatus without having the resultant high lead wire capacitance produce undesirable effects. It will of course be recognized that such an R-C network may be used in the apparatus of FIGURES 1 and 2, as desired.

Specifically, in normal operation, the D.C. voltage provided at capacitor 96, due to flame current, is supplied to capacitor 97 through a voltage divider network consisting of resistor 129, parallel connected resistor 132 and capacitor 131, and insofar as a D.C. voltage is concerned, capacitor 131 may be disregarded. In actual practice resistor 132 is relatively large compared to resistors 129 and 130, and therefore substantially all of the D.C.

voltage on capacitor 96 is effective to charge capacitor 97, as above described.

However, consider now the case in which photocell 90 becomes shorted as, for example, by an excessive accumulation for soot deposited at the fuel burner unit. In this case, an A.C. voltage is applied to the R-C network 129—132. Capacitor 131 is selected to have a low impedance to this A.C. voltage, which is normally 60 cycles per second, and as a result this A.C. voltage is substantially all dropped across resistors 129 and 130 and very little such voltage is applied to capacitor 97. Thereby insuring that the monostable network will not respond under such a condition.

*Operation of FIGURE 3*

The operation of the modification of FIGURE 3 will now be described. While this apparatus may be used to monitor a number of conditions to which a condition sensing means is responsive, the photocell 90 will again be assumed to be positioned to sense the presence or absence of flame at a fuel burner unit and the apparatus of FIGURE 3 will be considered to be the flame detector portion of a complete combustion safeguard apparatus.

Upon photo cell 90 sensing the presence of flame at the fuel burner unit, capacitor 96 is charged to the polarity indicated and this charge is distributed through the R-C network 129—132 to charge capacitor 97. The static voltage developed across resistor 123 in the standby condition of the apparatus is such as to aid capacitor 96 in charging capacitor 97 and in this manner a certain minimum flame current is necessary, that is a certain minimum voltage is necessary on capacitor 96 for capacitor 97 to be charged to a value sufficient to cause gas tube 98 to break down, thus providing a short pulse of electrical current to control the monostable network.

Upon capacitor 97 being charged to this value, gas tube 98 breaks down such that this capacitor is discharged through the relaxation oscillator circuit including the base to emitter circuit of transistor 99. The direction of current flow of this circuit is such as to trigger this transistor from its stable conducting state to its unstable non-conducting state. On transistor 99 being rendered non-conductive, the base electrode 111 of transistor 100 has its potential level lowered substantially such that this transistor is triggered from its stable non-conducting state to its unstable conducting state. As above mentioned, capacitor 121 now discharges through a circuit including resistor 107, diode 125, resistor 103 and transistor 100, and this discharge current initially aids the increasing relay current in developing a relatively high voltage across resistor 103, which in turn is effective to maintain the monostable network in its unstable condition as capacitor 116 charges. In this manner, relay 114 is energized.

As soon as capacitor 116 has received its maximum charge from resistor 103, the monostable network returns to its stable condition. Diode 117 is now effective to substantially immediately discharge capacitor 116. It will be remembered that capacitor 116 discharges at this time due to the relatively low current flowing through resistor 103 and the emitter to collector circuit of transistor 99.

Furthermore, when transistor 99 is rendered conductive, and transistor 100 non-conductive, nearly all of the D.C. voltage present between terminals 101 and 102 is applied to the resistors 123 and 124. But capacitor 121 is in a discharged condition at this time and therefore all of this voltage is developed across resistor 123 in a transient manner. That is, initially all of the voltage is present across resistor 123 and as capacitor 121 charges, the magnitude of voltage across resistor 123 decreases. In this fashion, a relatively high transient voltage is developed across resistor 123 which aids capacitor 96 in recharging capacitor 97. Therefore, while a given minimum flame current is necessary to initially trigger the monostable network, the monostable network continues to cycle between its stable and unstable conditions on a somewhat lower flame current. More important, the network cycles such that for a relatively long time transistor 100 conducts and then transistor 100 does not conduct only for a very short time. Moreover, each time, providing there is a minimum magnitude flame current, the monostable network reverts to its stable state the transient voltage across resistor 123 which then occurs insures that a new pulse from the relaxation oscillator occurs within a very short time so that the network again reverts to its unstable state. This then has the effect of maintaining the relay coil effectively continuously energized.

From the above description it can be seen that I have provided, in the various modifications, an improved condition sensing apparatus having both an improved pulse stretching arrangement and an arrangement which provides a high voltage transient effect which has the effect of producing a differential in the operation of the system requiring a given minimum flame current to initially energize the flame relay and allowing the flame relay to be maintained energized on a somewhat lower flame current.

I claim as my invention:

1. Condition sensing apparatus comprising; a monostable electronic network having a stable operating condition, condition sensing means arranged to be subjected to a given condition to be sensed, circuit means connecting said condition sensing means to said monostable electronic network to apply a repetitive electrical signal of short time duration thereto upon said condition sensing means being subjected to the given condition to thereby cause said monostable electronic network to change from said stable to an unstable operating condition, electrical energy storage means having an initial state of energy storage, means connecting said energy storage means in controlling relation to said monostable electronic network to maintain said network in said unstable operating condition for a relatively long time interval as said initial state of energy storage changes over said relatively long time interval to thereby effectively stretch said electrical signal, whereupon said monostable electronic network returns to said stable operating condition, and further means connected to said energy storage means and effective upon said electronic network returning to said stable operating condition to substantially immediately restore said energy storage means to said initial state of energy storage.

2. Condition sensing apparatus comprising; a monostable electronic network having a stable condition and unstable condition, a capacitor connected in controlling relation to said monostable electronic network in a manner to assume a given state of electrical charge when said monostable electronic network is in said stable condition, condition sensing means arranged to be subjected to a condition to be sensed, circuit means connecting said condition sensing means to said monostable electronic network to apply a repetitive electrical input signal of relatively short time duration thereto upon said condition sensing means sensing the condition, said input signal being effective to pulse said monostable electronic network from said stable to said unstable condition whereupon the said capacitor is effective to maintain said monostable electronic network in said unstable condition for said relatively long time period as the charge on said capacitor changes from said given state of charge over said relatively long time period, to thereby effectively stretch said input signal, said monostable electronic network returning to said stable condition after said long time period, and means connected to said capacitor and effective to substantially immediately restore said capacitor to said given state of charge upon said monostable electronic network returning to said stable condition.

3. In combination, a pulse stretching network having a first and a second controllable current conducting device interconnected to establish a stable operating condition wherein said first device is in a conducting state and said second device is in a nonconducting state, electrical energy storage means connected to said network in a manner to be placed in a first condition when said network is in said stable operating condition, means adapted to receive an input signal of short duration which may be applied to said network to cause said network to change from said stable operating condition to an unstable operation condition, said electrical energy storage means then being effective to maintain said network in said unstable operating condition for a relatively long time period as said energy storage means gradually changes from said first condition to a second condition, whereupon said network returns to said stable operating condition to thereby stretch the input signal, and a current conducting device connected to said energy storage means to substantially immediately restore said energy storage means to said first condition to thereby substantially immediately place said network in a condition to again stretch a further input signal.

4. In combination, a source of direct current voltage having a positive and a negative terminal, voltage dividing means connected across said terminals; a first transistor having an emitter, a base and a collector electrode; circuit means connecting the emitter electrode of said first transistor to said positive terminal and the base electrode of said first transistor through impedance means to said negative terminal to thereby provide a biasing current establishing a stable conducting state for said first transistor, further circuit means including an impedance connecting the collector electrode of said first transistor to said negative terminal; a second transistor having an emitter, a base and a collector electrode; circuit means connecting the emitter electrode of said second transistor to an intermediate point on said voltage dividing means, circuit means connecting the base electrode of said second transistor to the collector electrode of said first transistor to thereby establish a stable nonconducting state for said second transistor, circuit means including further impedance means connecting the collector electrode of said second transistor to said negative terminal, input circuit means including the emitter and base electrodes of said first transistor adapted to receive repetitive electrical signal pulses of relatively short time duration to thereby pulse said first transistor to a nonconducting state and said second transistor to a conducting state, a capacitor having a normal state of charge connected in circuit with said positive and negative terminals and the base to emitter circuit of said first transistor to maintain said first transistor in said nonconducting state for a relatively long time period as the charge on said capacitor changes from said normal state, to thereby effectively stretch the electrical signal pulse, said first and second transistors returning to said stable state after said relatively long time period; and a rectifier connected in circuit with said capacitor to substantially immediately restore said capacitor to said normal state of charge upon said first and second transistors returning to said stable state.

5. In combination, a source of direct current voltage having a positive and a negative terminal, a transistor having an emitter electrode connecting to said positive terminal and a base electrode connected through impedance means to said negative terminal to establish a stable conducting condition of operation, further circuit means including impedance means connecting the collector electrode of said transistor to said negative terminal, a capacitor connected in circuit to the terminals of said source of voltage and to the emitter and base electrodes of said transistor to thereby assume an initial state of charge, input circuit means including the emitter and base electrode of said transistor adapted to cyclically receive an input signal of relatively short time duration to thereby render said transistor nonconductive, said capacitor then serving to maintan said transistor nonconductive for a relatively long time period determined by the changing charge on said capacitor, and a rectifier connected to said capacitor to substantially immediately restore said capacitor to said initial state of charge upon said transistor returning to said stable condition.

6. Condition sensing apparatus comprising; a condition senser adapted to be positioned to sense a given condition, a first capacitor arranged to be charged by said condition senser, a transistor having a stable state of conduction, a relaxation oscillator including said first capacitor and the input electrodes of said transistor such that upon a given charge being accumulated on said first capacitor, said first capacitor discharges through the input electrodes of said transistor to apply a short pulse of electrical energy thereto to pulse said transistor from said stable state to an unstable state of conduction, a second capacitor having a normal state of charge, circuit means connecting said second capacitor to said transistor in a manner to maintain said transistor in said unstable state of conduction for a relatively long time period as the charge on said second capacitor changes to thereby effectively stretch the short pulse of electrical energy received from said relaxation oscillator, and means connected to said second capacitor in a manner to substantially immediately restore said second capacitor to said normal state of charge after said relatively long time period.

7. Condition sensing apparatus comprising; a source of direct current voltage having a positive and a negative terminal, a transistor having an emitter electrode connected to said positive terminal and a base electrode connected through an impedance element to said negative terminal to thereby provide a biasing current establishing a stable conducting condition for said transistor, further circuit means including impedance means connecting the collector electrode of said transistor to said negative terminal, a relaxation oscillator circuit including a first capacitor and a gaseous discharge tube connected in circuit with the emitter and base electrodes of said transistor, further circuit means including condition sensing means adapted to charge said first capacitor in accordance with the condition being detected by said condition sensing means, said relaxation oscillator being effective upon a sufficient charge being accumulated on said first capacitor to provide a short time duration pulse of electrical current to render said transistor nonconductive, a second capacitor connected to said source of voltage and having an initial state of charge, means connecting said second capacitor to said transistor to maintain said transistor in said unstable condition for a relatively long time period as said initial state of charge changes, and a rectifier connected to said second capacitor and adapted to substantially immediately restore said second capacitor to said initial state of charge upon said transistor again assuming said stable condition.

8. Condition sensing apparatus comprising; a transistor having an emitter electrode connected to a source of positive potential and a base electrode connected through impedance means to a source of negative potential, further circuit means including an output relay controlled by the collector electrode circuit of said transistor, means biasing said transistor to a stable conducting condition, a first capacitor, circuit means connecting said first capacitor to said source of negative potential and said base electrode to charge said first capacitor to a given state, a relaxation oscillator including a second capacitor adapted to be charged by a condition sensing means, said relaxation oscillator also including the emitter to base circuit of said transistor such that upon said second capacitor receiving a given charge, said second capacitor discharges through said emitter to base circuit to render said transistor substantially nonconductive, said transistor being maintained in said nonconductive state for a time period determined by the discharge rate of said first capacitor to thereby provide a pulse stretching function to energize said output relay, and a rectifier connected from said positive terminal to said first capacitor to substantially immediately restore the charge on said first capacitor to said given state upon said transistor returning to said conductive state.

9. In combination, a source of direct current voltage having a positive and a negative terminal, a transistor having an emitter electrode connected to said positive terminal and a base electrode connected through a first resistor to said negative terminal, circuit means including a load impedance connecting the collector electrode of said transistor to said negative terminal, said transistor thereby being provided with a biasing current establishing a stable conducting state for said first transistor, a capacitor, circuit means connecting said capacitor from said positive terminal to said base electrode such that said capacitor is initially charged to a low value when said transistor is in said stable conducting state, input circuit means connected to said emitter and base electrodes and adapted to provide an electrical signal pulse of relatively short time duration to place said transistor in a nonconducting state, said capacitor then being charged to a higher value and being effective during the period it is being so charged to maintain said transistor in said nonconducting condition as long as said capacitor continues to charge to thereby provide a stretching of said signal pulse, said normal biasing current of said transistor thereafter being effective to cause the transistor to again assume said stable conducting state, and impedance circuit means including a rectifier shunting said capacitor and arranged to substantially immediately discharge said capacitor to said initial low value upon said transistor again assuming said stable condition of operation.

10. Condition responsive apparatus comprising; a condition sensor adapted to sense the presence of a given condition and to supply electrical current upon sensing the given condition, a first and a second impedance means connected in series to a source of voltage, a capacitor, circuit means connecting said capacitor to said condition sensor through said first impedance means, said capacitor being charged by said condition sensor and by the voltage present across said first impedance means, current responsive means having an input circuit, a relaxation oscillator type circuit including said capacitor and the input of said current responsive means, said relaxation oscillator being effective upon a given state of charge being accumulated on said capacitor to discharge said capacitor and provide a momentary signal current to control said current responsive means, and further means connected to said second impedance means and effective to substantially reduce the impedance thereof upon said current responsive means being so controlled, to thereby cause substantially the entire voltage of said voltage source to appear across said first impedance means to aid the recharging of said capacitor.

11. Condition responsive apparatus comprising; circuit means including condition responsive means adapted to provide an output current whose magnitude is dependent upon the condition to which said condition responsive means is subjected, a capacitor, a first resistor, circuit means connecting said capacitor and said first resistor in series to the output of said circuit means to charge said capacitor to a value dependent upon the condition to which said condition responsive means is subjected, a source of voltage, a second resistor, circuit means connecting said first and second resistors in series to said source of voltage to cause a portion of said source of voltage to appear across said first resistor in a manner to aid the charging of said capacitor, a controllable current conducting device having a pair of input electrodes, voltage responsive switch means, circuit means connecting said switch means and said capacitor in series circuit to the input electrodes of said controllable current conducting device, said last named circuit functioning as a relaxation oscillator such that upon a predetermined electrical charge being accumulated on said capacitor, said capacitor discharges and provides a pulse of electrical current to control said controllable current conducting device, and further means effective upon said controllable current conducting device being so controlled to substantially short circuit said second resistor to thereby cause substantially the entire voltage of said voltage source to appear across said first resistor to aid in the recharging of said capacitor.

12. In combination, a source of direct current operating voltage having a positive and a negative terminal, a transistor having an emitter electrode connected to said positive terminal and having a base electrode connected through an impedance element to said negative terminal to provide a biasing current for said transistor which establishes a stable conducting state for said transistor, further circuit means including means to be controlled by the output of said transistor connecting the collector electrode of said transistor to said negative terminal, a capacitor connected from said base electrode to one of said terminals, said capacitor being charged to an initial value determined by the potential level of said base electrode with respect to said one terminal, input circuit means including means adapted to apply a pulse of electrical current of relatively short time duration to electrodes of said transistor such that said transistor is rendered nonconductive, the potential of said base electrode when said transistor is nonconductive being altered such that said charge on said capacitor changes and is effective to maintain said transistor nonconductive for a relatively long time period to thereby stretch said short pulse of electrical current, said transistor then being effective to again assume said stable condition, and further means effective upon said transistor returning to said stable condition to substantially immediately restore the charge on said capacitor to said initial value to thereby substantially immediately condition said transistor to stretch a further electrical current pulse.

13. Condition sensing apparatus comprising; a source of direct current voltage having a positive and a negative terminal, a transistor having an emitter electrode connected to said positive terminal and a base electrode connected through impedance means to said negative terminal, to thereby apply a biasing current to said transistor which establishes a stable conducting operating state for said transistor, further circuit means including switching means connecting the collector electrode of said transistor to said negative terminal, a capacitor, circuit means connecting said capacitor between said base electrode and said negative terminal such that said capacitor is charged to substantially the full voltage of said source of voltage, a second capacitor, condition sensing means adapted to charge said second capacitor in accordance with the condition to which said condition sensing means is subjected, a gas discharge tube, a relaxation oscillator circuit connecting said second capacitor and said gas discharge tube in a series circuit with the emitter and base electrodes of said transistor, said relaxation oscillator circuit functioning upon said second capacitor receiving a given charge to provide a short pulse of an electrical current to render said transistor nonconductive, said first capacitor then being effective as it discharges to maintain said transistor in said nonconducting state for a relatively long time period to thereby stretch said short current pulse, said biasing current of said transistor being effective after said relatively long time period to again cause said transistor to assume said stable conducting state, and a rectifier connected from said positive terminal to said first capacitor to thereby substantially immediately recharge said first capacitor upon said transistor assuming said stable state to thereby place said transistor in a condition to effectively stretch a further current pulse applied to the emitter and base electrodes of said transistor.

14. Condition sensing apparatus comprising; a source of direct current operating voltage having a positive and a negative terminal, a first impedance, a first transistor having an emitter electrode connected through said first impedance to said positive terminal and a base electrode connected to biasing means including a further transistor which establishes a stable nonconducting state for said first transistor, circuit means including a second impedance connecting the collector electrode of said first transistor to said negative terminal, a capacitor connected from said positive terminal to the input of said further transistor such that a low magnitude charge is placed on said capacitor when said first transistor is in said stable state, a relaxation oscillator type network including a second capacitor, condition sensing means adapted to charge said second capacitor in accordance with the condition to which it is subjected, said relaxation oscillator circuit functioning such that upon a predetermined charge being accumulated on said second capacitor the charge is distributed over a short time duration as an electrical current pulse to control said further transistor and thereby render said first transistor conductive, said first capacitor then being charged through the input of said further transistor to maintain said further transistor in said controlled condition so long as said first capacitor continues to charge, and further circuit means including a rectifier adapted to substantially immediately discharge said first capacitor.

15. Condition sensing apparatus comprising; a source of direct current voltage having a positive and a negative terminal, voltage dividing means connected to said terminals, a first transistor having an emitter electrode connected to an intermediate point on said voltage dividing means and having a base electrode connected through impedance means to said negative terminal, an output relay having an actuating winding, circuit means connecting said winding from said negative terminal to the connector electrode of said first transistor, a second transistor having an emitter electrode connected to said positive terminal and having a base electrode connected through an impedance to said negative terminal, circuit means connecting the collector electrode of said second transistor to the base electrode of said first transistor, said first and second transistors thereby being connected in a monostable circuit having a stable condition wherein said first transistor is nonconductive and said second transistor is conductive, a first capacitor, circuit means connecting said first capacitor from the base electrode of said second transistor to the collector electrode of said first transistor to place a relatively high charge on said first capacitor when said first and second transistors are in said stable condition, second voltage dividing means connected across said first capacitor, a second capacitor connected across a first portion of said second voltage dividing means, a third capacitor, condition sensing means, circuit means connecting said third capacitor in series with a further portion of said second voltage dividing means and with said condition sensing means, said condition sensing means being adapted to charge said third capacitor upon being subjected to a given condition, relaxation oscillator circuit means including in series connection said third capacitor and the emitter to base circuit of said second transistor, said relaxation oscillator functioning upon a predetermined charge being placed on said third capacitor to bias said second transistor substantially to cut off causing said first and second transistors to move from said stable to an unstable condition wherein said first transistor is conductive and said second transistor in nonconductive, and circuit means providing a discharge path for said first capacitor to maintain said second transistor nonconductive for a relatively long time period during which said second capacitor discharges through said first portion of said second voltage dividing means, said first and second transistors thereafter returning to said stable condition to cause said first capacitor to be recharged substantially immediately and said second capacitor functioning to substantially short circuit said first portion of said second voltage dividing means for a short period of time and thereby place a relatively high voltage across said further portion of said second voltage dividing means in a transient manner, said relatively high voltage acting to aid said condition sensing means in recharging said third capacitor.

16. Condition sensing apparatus comprising; a monostable electronic network including a pair of cascade connected transistors having a stable condition wherein a first transistor is biased to be normally conductive and is connected in controlling relation to a second transistor to render said second transistor nonconductive, a further transistor, a relay having a winding, circuit means connecting the input circuit of said further transistor in series with the output circuit of said second transistor and said relay winding, a first capacitor connected from an input electrode of said first transistor to an output electrode of said second transistor such that said capacitor is charged to a relatively high value when said monostable network is in said stable condition, said first capacitor functioning to discharge over a relatively long time period to maintain said monostable electronic network in an unstable condition once said network is placed in said unstable condition, a second capacitor, energizing circuit means for said second capacitor including condition sensing means and adapted to charge said second capacitor in accordance with the condition to which said condition senser is subjected, further circuit means connecting said second capacitor to the input circuit of said first transistor such that upon a sufficient charge being accumulated on said second capacitor, said second capacitor discharges through the input circuit of said first transistor to place said monostable electronic network in said unstable condition, a first and second series connecting resistor connected in parallel with said first capacitor, circuit means connecting said first resistor in series with said second capacitor such that the voltage across said first resistor aids said condition sensing means in charging said second capacitor, and further circuit means connecting the output electrodes of said further transistor in parallel with said second resistor such that upon said monostable network returning to said stable condition, the magnetic flux existing in said relay winding provides an energizing current for the input circuit of said further transistor to thereby substantially short circuit said second resistor and cause substantially the entire voltage of said first capacitor to be applied across said first resistor to aid the recharging of said second capacitor.

17. Condition sensing apparatus comprising; a source of direct current voltage having a positive and a negative terminal, a first transistor having an emitter electrode connected to said positive terminal and having a base electrode connected through a first impedance element to said negative terminal to thereby provide a biasing current establishing a stable conducting condition for said first transistor; a second transistor, circuit means connecting the collector electrode of said first transistor to the base electrode of said second transistor and to said negative terminal, further circuit means connecting the emitter and collector electrodes of said second transistor in series with an output relay winding to said positive and negative terminals, said second transistor thereby having a stable nonconducting condition; a first capacitor connected from said positive terminal to the base electrode of said first transistor, a first and a second series connected resistor connected from the base electrode of said first transistor to the collector electrode of said second transistor, a second capacitor connected in parallel with said second resistor, a third capacitor connected in series with a gaseous discharge tube and with the emitter and base electrodes of said first transistor to form a relaxation oscillator circuit, condition sensing network means having an output voltage upon being subjected to a given condition, circuit means connecting said last named means in series with said third capacitor and said first resistor to charge said third capacitor, said relaxation oscillator circuit then being effective to discharge said third capacitor and place said first and second transistors in an unstable state wherein said first transistor is nonconductive and said second transistor is conductive, said first capacitor then maintaining said first and second transistors in said unstable condition as said first capacitor charges to a given value whereupon said first and second transistors again assume said stable condition, and circuit means including a unidirectional current conducting device adapted to substantially immediately discharge said first capacitor upon said first and second devices returning to said stable condition, said second capacitor discharging through said second resistor while said first and second transistors are in said unstable condition and functioning to substantially short circuit said second resistor and cause a relatively high transient voltage to be applied across said first resistor to aid the recharging of said third capacitor upon said first and second transistors initially returning to said stable condition.

18. Condition sensing apparatus comprising; condition sensing means arranged to provide a small magnitude electrical current when subjected to a given condition, a capacitor arranged to be charged by said condition sensing means, a relaxation oscillator circuit including said capacitor, a monostable electronic network having a stable condition and an unstable condition, means connecting said relaxation oscillator to the input of said monostable electronic network in a manner to cause said network to move from said stable to said unstable condition upon discharge of said capacitor through said relaxation oscillator circuit, further circuit means connected to maintain said monostable network in said unstable condition for a relatively long time period to thereby perform a pulse stretching function, and means effective upon said network again returning to said stable condition to provide a transient voltage to aid said condition sensing means in the recharging of said capacitor to thereby insure continuous cycling of said monostable network so long as said sensing means is subjected to the given condition.

19. Condition sensing apparatus comprising, a source of direct current having a positive and a negative terminal, a transistor having its emitter connected through a first resistor to said positive terminal and having its base connected through a second resistor to said negative terminal to thereby establish a stable conducting state for said transistor, a capacitor connected from said positive terminal to said base to charge in accordance with the potential level of said base, condition sensing means connected to control said transistor in a manner to cause said transistor to become nonconductive upon the occurrence of a given condition, the potential level of said base thereby being lowered to cause said capacitor to charge and to maintain said transistor in said nonconducting state so long as said capacitor continues to charge, and circuit means including a diode connected to said capacitor and effective to substantially immediately discharge said capacitor upon said transistor reverting to said stable conducting state.

20. Condition sensing apparatus comprising; a source of direct current voltage having a positive and a negative terminal, a first transistor having its emitter connected through a first resistor to said positive terminal and its base connected through a second resistor to said negative terminal to establish a stable conducting state of operation, circuit means connecting the collector of said first transistor to said negative terminal; a second transistor having its base connected to the collector of said first transistor and having its emitter connected to the emitter of said first transistor, to establish a stable nonconducting state of operation for said second transistor, circuit means connecting the collector of said second transistor to said negative terminal; a first capacitor connected from said positive terminal to the base of said first transistor such that said first capacitor is charged in accordance with the potential level of said base, a first diode connected in its forward direction from the emitter to the base of said first transistor to discharge said first capacitor; a third and a fourth series connected resistor connected from the base of said first transistor to the collector of said second transistor, a second capacitor connected in parallel with said fourth resistor so as to be charged when said first and second transistor are in said stable state, a second diode connected in its forward direction from the junction of said third and fourth resistors to said positive terminal to discharge said second capacitor through said first resistor and the emitter to collector circuit of said second transistor upon said first and second transistor assuming their unstable state; condition sensing means providing an electrical output upon being subjected to a given condition, and means connecting the output of said condition sensing means in series with said third resistor to the base and emitter electrode of said first transistor to trigger said first and second transistors to their unstable states upon the occurrence of said given condition.

21. Condition responsive apparatus comprising; a condition sensor adapted to sense the presence of a given condition and to supply a low magnitude electrical current upon sensing the given condition, a first and a second impedance means connected in series to a source of voltage, a capacitor, circuit means connecting said capacitor to said condition sensor through said first impedance means to charge said capacitor by said condition sensor and by the voltage present across said first impedance means; a monostable electronic network having an input and having a stable operating condition, a relaxation oscillator type circuit including said capacitor and the input of said monostable network, said relaxation oscillator being effective upon a given state of charge being accumulated on said capacitor to discharge said capacitor and provide a short time duration signal current pulse to control said monostable network from said stable to an unstable condition, electrical energy storage means connected in controlling relation to said monostable network to establish an initial state of energy storage for said energy storage means, said energy storage means being effective to maintain said monostable network in said unstable condition for a relatively long time interval, during which interval the state of energy storage of said energy storage means is altered and effectively stretches said signal current pulse, whereupon said monostable network again returns to said stable condition, control means connected to said energy storage means and effective upon said monostable network returning to said stable condition to substantially immediately restore said energy storage means to said initial state of energy storage to facilitate an immediate reoccurrence of the pulse stretching action, and further means connected to said second impedance means and effective to substantially reduce the impedance thereof upon said monostable network returning to said stable condition, to thereby cause substantially the entire voltage of said voltage source to appear across said first impedance means to aid the recharging of said capacitor.

References Cited in the file of this patent

UNITED STATES PATENTS

| | | |
|---|---|---|
| 2,852,702 | Pinckaers | Sept. 16, 1958 |
| 2,879,456 | Pinckaers | Mar. 24, 1959 |